(12) United States Patent
Chapman

(10) Patent No.: US 12,271,450 B2
(45) Date of Patent: Apr. 8, 2025

(54) DIGITAL INVISIBLE INK

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 283 days.

(21) Appl. No.: 18/093,326

(22) Filed: Jan. 5, 2023

(65) Prior Publication Data

US 2024/0232302 A1 Jul. 11, 2024

(51) Int. Cl.
| | | |
|---|---|---|
| *G06T 1/00* | (2006.01) | |
| *G06F 21/16* | (2013.01) | |
| *G06F 21/10* | (2013.01) | |
| *H04N 1/32* | (2006.01) | |

(52) U.S. Cl.
CPC ............... *G06F 21/16* (2013.01); *G06T 1/00* (2013.01); *G06F 21/1063* (2023.08); *G06T 1/0021* (2013.01); *H04N 1/32154* (2013.01)

(58) Field of Classification Search
CPC .............. G06T 1/0021; H04N 1/32154; G06F 21/1063; G06F 21/16
See application file for complete search history.

(56) References Cited

U.S. PATENT DOCUMENTS

| | | | |
|---|---|---|---|
| 7,202,959 B2 | 4/2007 | Silverbrook et al. | |
| 8,224,019 B2 | 7/2012 | Fan et al. | |
| 8,261,988 B2 | 9/2012 | Zhao et al. | |
| 8,797,602 B2 | 8/2014 | Chapman et al. | |
| 8,867,782 B2 | 10/2014 | Kurtz et al. | |
| 9,225,988 B2 * | 12/2015 | Tourapis | H04N 19/186 |
| 9,444,969 B2 | 9/2016 | Miller et al. | |
| 2015/0199551 A1 | 7/2015 | Kritt et al. | |
| 2016/0027042 A1 | 1/2016 | Heeter | |
| 2021/0268828 A1 * | 9/2021 | Jolic | B42D 25/351 |

OTHER PUBLICATIONS

S. Sakshi, S. Verma, P. Chaturvedi and S. A. Yadav, "Least Significant Bit Steganography for Text and Image hiding," 2022 3rd International Conference on Intelligent Engineering and Management (ICIEM), London, United Kingdom, 2022, pp. 415-421, (Year: 2022).*
"CMYK Color Model," Wikipedia, Retrieved from "https://en.wikipedia.org/w/index.php?title=CMYK_color_model&oldid=1128975648";edited on Dec. 23, 2022, at 00:10 (UTC).

(Continued)

*Primary Examiner* — Carl G Colin
*Assistant Examiner* — Phillip Emmanuel Wilson
(74) *Attorney, Agent, or Firm* — Ortiz & Lopez, PLLC; Luis M. Ortiz; Kermit D. Lopez

(57) ABSTRACT

Methods, systems and security devices for rendering digital invisible ink, can involve representing an invisible item in a single color that is not discernable from white by a human eye, embedding the invisible item into white space of a digital document, and converting the invisible item into a visible item using a transform table that defines how to convert the single color of the invisible item so that the invisible item after a conversion to the visible item is discernable by the human eye.

16 Claims, 8 Drawing Sheets

(56) References Cited

OTHER PUBLICATIONS

"CIELAB Color Space," Wikipedia, Retrieved from "https://en.wikipedia.org/w/index.php? title=CIELAB_color_space&oldid=1129787482", page was last edited on Dec. 27, 2022, at 03:39 (UTC).
Yaman F. Abdullah, and Hebah H. O. Nasereddin, "Proposed Data Hiding Technique—Text under Text", American Academic & Scholarly Research Journal, vol. 5, No. 3, Apr. 2013, www.aasrc.org/aasrj.
Rupert Jones, "Social media users warned over rise in online ticket fraud," The Guardian, https://www.theguardian.com/money/2016/mar/21/online-ticket-fraud-social-media-users-warned-twitter-facebook-get-safe-online, Sun Mar. 20, 2016 20.01 EDT.
Megan Leonhardt, "About 12 perdent of people buying concert tickets get scammed," Published Friday Sep. 14, 2018; https://www.cnbc.com/2018/09/13/about-12-percent-of-people-buying-concert-ticketsget-scammed-.html.
"Xerox® Specialty Imaging: Fraud Deterrent Technology", https://www.xerox.com/en-US/digital-printing/fraud-deterrent-technology, 2022.

* cited by examiner

DIGITAL INVISIBLE INK

TECHNICAL FIELD

Embodiments are related to image processing methods, systems and devices. Embodiments also relate to printing devices and techniques. Embodiments further relate to security devices such as digital invisible ink. Embodiments are further related to methods and systems for providing digital invisible ink and rendering a document with such digital invisible ink.

BACKGROUND

In conventional printing processes that require security measures, a pattern color space having specialty imaging characteristics can be used to provide security measures and prevent counterfeiting of printed materials. Furthermore, in conventional printing processes, a pattern color space can be used, in part on variable data, such as printing logos, serial numbers, seat locations, or other types of unique identifying information on printed materials.

Security is an important requirement in many document production applications. In situations such as official or government document printing, event ticket printing, financial instrument printing and the like, many documents must be protected against copying, forging and/or counterfeiting. To accomplish this, printed documents often include security marks or security features that serve to prevent counterfeiting and/or identify a document as original.

Thus, in security applications, it may be desirable to add information to a document in the form of a security mark or a security feature that may prevent or hinder alterations and counterfeiting. Specialty imaging has been used, conventionally, in printed materials to provide fraud protection and anti-counterfeiting measures for such security applications. Some examples include prescriptions, contracts, documents, coupons, and tickets. Typically, several specialty-imaging techniques can be used at various positions in a document. In addition, these security elements may in some cases conflict with the overall aesthetics of the document.

In the area of security printing, documents are protected from copying, forging, and counterfeiting using multiple techniques. Specialty Imaging is one such method of security printing which uses standard material such as papers inks and toners. Typically, security printing companies in the marketplace require special (expensive) materials. An example document is a prescription where a pharmacist would like to be able to have a good level of confidence that the document is genuine.

Information on specialty imaging including infrared mark text and ultra violet mark text can be found at this webpage: https://www.xerox.com/en-us/digital-printing/secure-printing, which is incorporated herein by reference in its entirety. A design goal of a metameric pair of IR inks, for example, is to appear to be about the same color/pattern under office illumination. That is, text and/or other graphics can become visible with an IR camera.

Many digital security documents such as an event ticket rely on a barcode, which can be scanned at the event but allows only one holder of that ticket to enter. Despite these efforts at security printing for tickets and other documents, it has been estimated that about 12% of people have been scammed purchasing a concert ticket. Furthermore, with the advent of social media, online ticket fraud has increased as criminals increasingly made use of social media to rip off music and sports fans, according to new research. Fans have put themselves at risk by sharing images of event tickets on social media sites that can then be used by scammers to create fakes.

As noted above, specialty imaging supports watermarks such as infrared (IR) and ultra-violet (UV). These are expected to appear as a single color/pattern under office lighting with a visible watermark under e.g., UV light. These effects work when printed on media but not digitally. They protect a printed concert ticket from fraud but not the same ticket on a phone. They also use up valuable space (real estate) on the document (e.g., prescription, concert ticket, coupon, etc.). Many event tickets are protected only with a barcode so a copy either digital or printed will let the first user enter and flag any others even those that legitimately purchased the ticket.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the embodiments to provide for improved image-processing methods, systems, and devices.

It is another aspect of the embodiments to provide for improved printing devices and rendering techniques.

It is yet another aspect of the embodiments to provide for an improved security device.

It also an aspect of the embodiments to provide for methods and systems for providing digital invisible ink and rendering a document with such digital invisible ink.

Is a further aspect of the embodiments to provide for methods and systems for embedding a hidden/invisible image or text into the white space of a digital document and converting the invisible item into a visible item.

The aforementioned aspects and other objectives and advantages can now be achieved as described herein. In an embodiment, a method for rendering digital invisible ink, can involve: representing an invisible item in a single color that is not discernable from white by a human eye; embedding the invisible item into white space of a digital document; converting the invisible item into a visible item using a transform table that defines how to convert the single color of the invisible item so that the invisible item after a conversion to the visible item is discernable by the human eye.

An embodiment of the method can further involve configuring the transform table as a table containing data indicative of at least: a color space, a depth value, a color and a transform action.

An embodiment of the method can further involve creating an image in a color space defined in the transform table, wherein the invisible item comprises the image.

An embodiment of the method can further involve adding the image to the white space.

An embodiment of the method can further involve reading the transform table and determining when the image meets criterion specified in the transform table.

An embodiment of the method can further involve converting the invisible item into a visible item, further comprising: performing the transform action.

An embodiment of the method can further involve configuring the transform table as a table containing data indicative of at least: a color space, a depth value, a color and a transform action; creating an image in a color space defined in the transform table, wherein the invisible item comprises the image; adding the image to the white space; reading the transform table; determining when the image meets criterion specified in the transform table.

In another embodiment, a system for rendering digital invisible ink, can include at least one processor and a memory, the memory storing instructions to cause the at least one processor to perform: representing an invisible item in a single color that is not discernable from white by a human eye; embedding the invisible item into white space of a digital document; converting the invisible item into a visible item using a transform table that defines how to convert the single color of the invisible item so that the invisible item after a conversion to the visible item is discernable by the human eye.

In an embodiment of the system, the instructions can further cause the at least one processor to perform: configuring the transform table as a table containing data indicative of at least: a color space, a depth value, a color and a transform action.

In an embodiment of the system, the instructions can further cause the at least one processor to perform: creating an image in a color space defined in the transform table, wherein the invisible item comprises the image.

In an embodiment of the system, the instructions can further cause the at least one processor to perform: adding the image to the white space.

In an embodiment of the system, the instructions can further cause the at least one processor to perform: reading the transform table; and determining when the image meets criterion specified in the transform table.

In an embodiment of the system, the instructions for converting the invisible item into a visible item, can further involve performing the transform action.

In an embodiment of the system, the instructions can further cause the at least one processor to perform: configuring the transform table as a table containing data indicative of at least: a color space, a depth value, a color and a transform action; creating an image in a color space defined in the transform table, wherein the invisible item comprises the image; adding the image to the white space; reading the transform table; and determining when the image meets criterion specified in the transform table.

In another embodiment, a security apparatus for rendering digital invisible ink, can include: an invisible item represented in a single color that is not discernable from white by a human eye; the invisible item embedded into white space of a digital document; and the invisible item covered into a visible item with a transform table that defines how to convert the single color of the invisible item so that the invisible item after a conversion to the visible item is discernable by the human eye.

In an embodiment of the security apparatus, the transform table is operable as a table containing data indicative of at least: a color space, a depth value, a color and a transform action.

In an embodiment of the security apparatus, an image can be created in a color space defined in the transform table, wherein the invisible item comprises the image.

In an embodiment of the security apparatus, the image can be added to the white space.

In an embodiment of the security apparatus, the transform table can be read; and a determination can be made regarding when the image meets criterion specified in the transform table.

In an embodiment of the security apparatus, the invisible item can convert into a visible item involves performing the transform action.

In an embodiment of the security apparatus, the transform table can be configured as a table containing data indicative of at least: a color space, a depth value, a color and a transform action; an image can be created in a color space defined in the transform table, wherein the invisible item comprises the image; the image can be added to the white space; the transform table can be read; and a determination can be made regarding when the image meets criterion specified in the transform table.

In an embodiment of the security apparatus, converting the invisible item into a visible item can further involve performing the transform action.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

DETAILED DESCRIPTION

Figure 1:
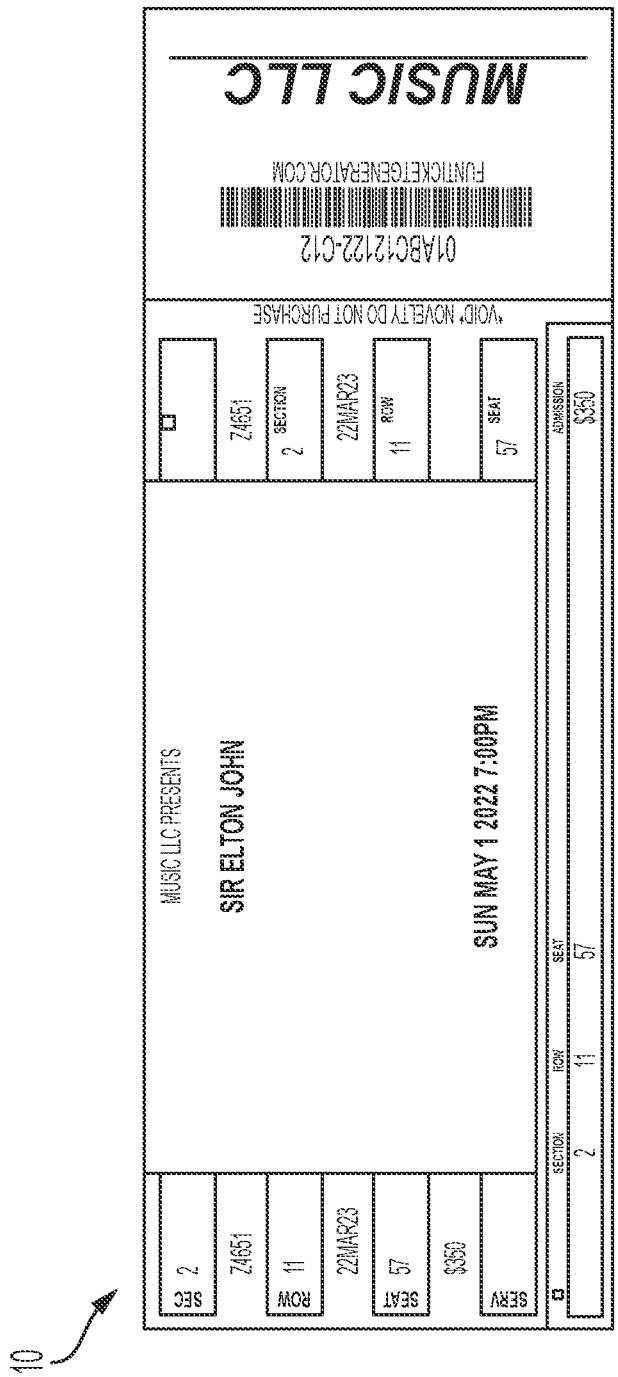
FIG. 1 illustrates an image of an unsecured or original ticket.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Furthermore, the term "at least one" as utilized herein can refer to "one or more". For example, "at least one widget" may refer to "one or more widgets."

The term "data" refers herein to physical signals that indicate or include information. An "image," as a pattern of physical light or a collection of data representing the physical light, may include characters, words, and text as well as other features such as graphics.

A "digital image" is by extension an image represented by a collection of digital data. An image may be divided into "segments," each of which is itself an image. A segment of an image may be of any size up to and including the whole image. The term "image object" or "object" as used herein is believed to be considered in the art generally equivalent to the term "segment" and will be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. An operation can perform "image processing" when it operates on an item of data that relates to part of an image.

The term "metameric" as utilized herein can relate to a metameric pair of pattern ink. In a metameric pair of pattern ink (also referred to simply as a "metameric pair") the printing and paper are not visually distinguishable when viewed from one angle but are from another angle (relative to a light source) which can create a watermark without more expensive spot inks, toners, and/or printers.

The term L*a*b (also referred to as Lab or LAB) as utilized herein relates to the CIELAB color space (L*a*b), which is a color space defined by the International Commission on Illumination (CIE). L*a*b It expresses color as three values: L* for perceptual lightness and a* and b* for the four unique colors of human vision: red, green, blue and yellow. CIELAB was intended as a perceptually uniform space, where a given numerical change corresponds to a similar perceived change in color. While the LAB space is not truly perceptually uniform, it nevertheless is useful in industry for detecting small differences in color.

The term CMYK as utilized herein relates to the CMYI color model, wherein CYMK refers to the four ink plates used: cyan, magenta, yellow, and key (black). The CMYK model works by partially or entirely masking colors on a lighter, usually white, background. The ink reduces the light that would otherwise be reflected. Such a model is considered subtractive because inks "subtract" the colors red, green and blue from white light. White light minus red leaves cyan, white light minus green leaves magenta, and white light minus blue leaves yellow. An example of an additive color model is the RGB color model in which the red, green, and blue primary colors of light are added together to reproduce a broad array of colors. "RGB" relates to the three primary colors, red, green and blue. RGB (i.e., the RGB color model) can be used for sensing, representation, and display of images in electronic systems, such as televisions and computers.

The term "watermark" as utilized herein can relate to a piece of a transparent text, image, logo or other markings that can be applied to media (e.g., a document, paper, a photo, an image, etc.), which can make it more difficult to copy or counterfeit the media (to which the watermark is applied through security printing) or use it without permission. A "watermark" can be a special-purpose text or picture that can be printed across one or more pages. For example, one can add a word like Copy, Draft, or Confidential as a watermark instead of stamping it on a document before distribution.

Embodiments relate to a new set of invisible inks that can be created along with a transform table. Each invisible ink can be a single color in an image that is generally not discernable (e.g., the LSB (least significant bit) of C in an 8 bpp CMYK image). The inks can be written into found or created white space. A transform can be created to convert from invisible ink and then stored in the transform table. In some embodiments, an app or web service can apply the transform when needed. The term 'digital invisible ink' as utilized herein can thus relate to the aforementioned new set of invisible inks.

The following methodology can be implemented, in accordance with one or more embodiments:
1) Start with a digital document (e.g., ticket)
2) Create transform table color space, depth, value, color and transform action
3) Determine or create suitable white space areas in any color space in ticket
4) Create image in a color space defined in the transform table
5) Add image to suitable white space
6) Save encoded ticket
7) Start with encoded ticket
8) Read transform table
9) Determine if each image meets the criteria specified in the transform table 10) If step 6 true perform the transform action 11) Present transformed document FIG. 1 illustrates an image 10 of a document comprising an unsecured or original ticket. That is, the image 10 depicted in FIG. 1 is an example of a digital concert ticket that can be created for step 1 above. For step 2 we can define the transform table as color space=CMYK depth=8 bpp, bit=LSB, color=K and transform black to plain magenta. The next entry is color space=RGB, depth=8 bpp bit=LSB, color=G and transform encrypted barcode to unencrypted barcode. Other transforms may be much more complex (e.g., barcode to playing a video, text to a character in the metaverse, encrypted text to crypto currency, etc.).

Figure 3:
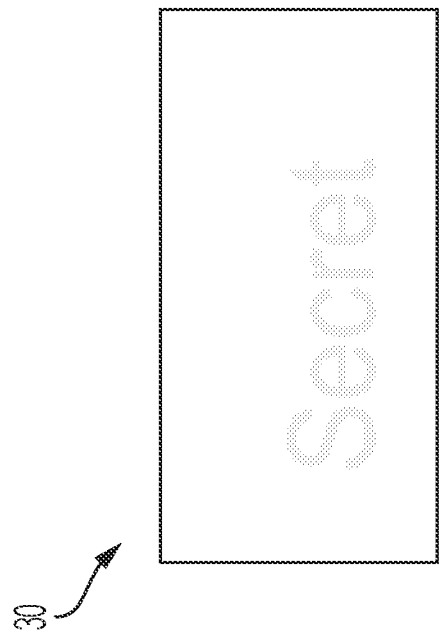
FIG. 3 illustrates an image of another LSB, in accordance with an embodiment.
Figure 2:
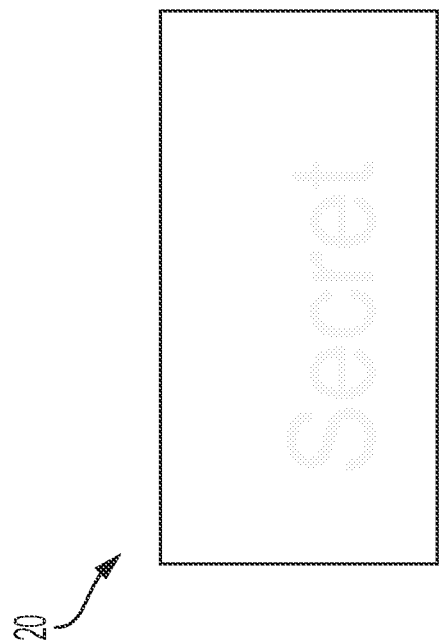
FIG. 2 illustrates an image with a 'secret' word written in LSB, in accordance with an embodiment.

FIG. 2 illustrates an image 20 with the word 'secret' written in LSB, in accordance with an embodiment. FIG. 3 illustrates an image 30 of another LSB, in accordance with an embodiment. The image 30 shown in FIG. 3 depicts a sample concert ticket having several areas of suitable white space in any color space. In other cases, a small rectangle in the ticket can be changed from filled to white. The document can also be scaled to create white space. It should be noted that the image 30 shown in FIG. 3 is easier to view than the image 20 depicted in FIG. 2.

Figure 4:
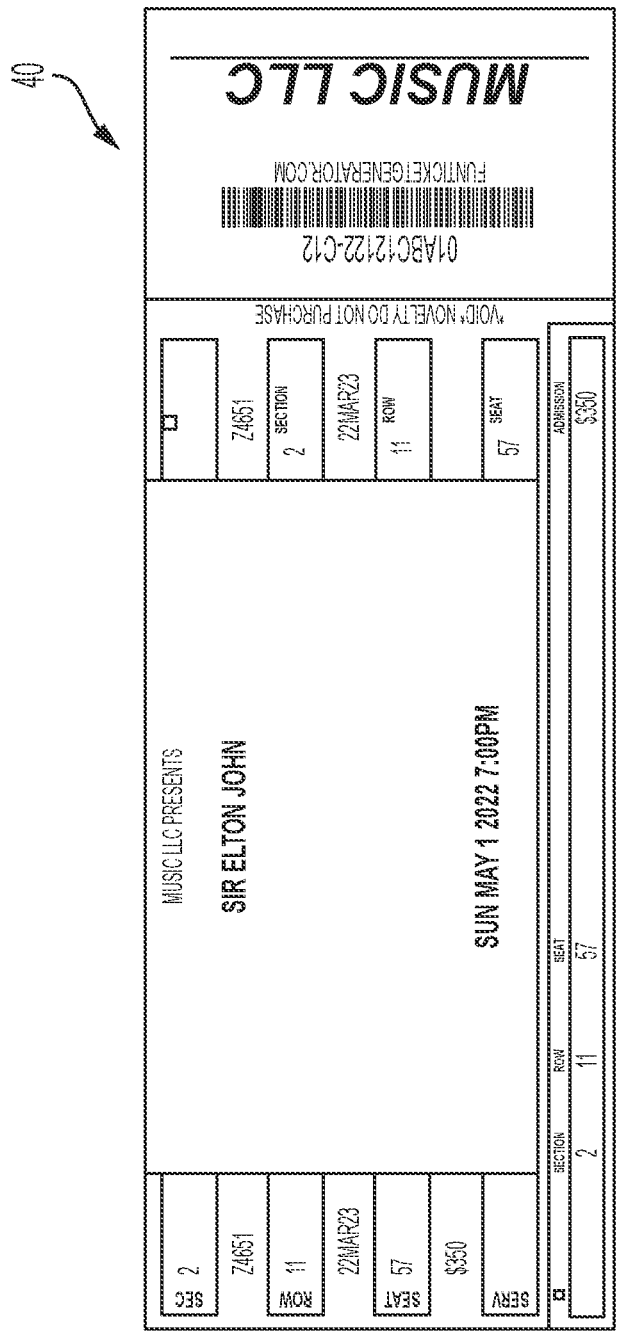
FIG. 4 illustrates an image of a sample ticket with invisible ink, in accordance with an embodiment.

FIG. 4 illustrates an image 40 of a sample ticket with invisible ink, in accordance with an embodiment. The image 40 is created after the operations shown at steps 4 and 5 have been added to the previously shown sample ticket and saved per the operation of step 6.

Figure 5:
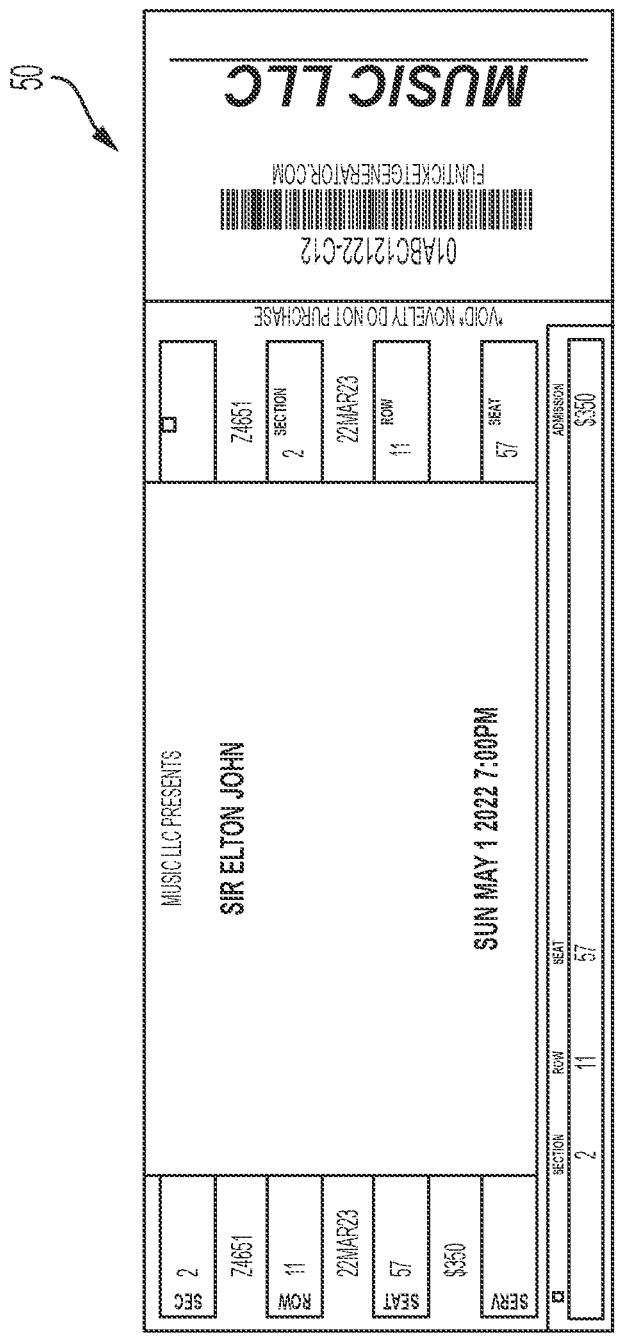
FIG. 5 illustrates an image of a ticket with images written thereon, in accordance with an embodiment.

FIG. 5 illustrates an image 50 of a ticket with images written thereon, in accordance with an embodiment. The image 40 shown in FIG. 5 is for clarification as to where the images were written and not an actual step.

Figure 6:
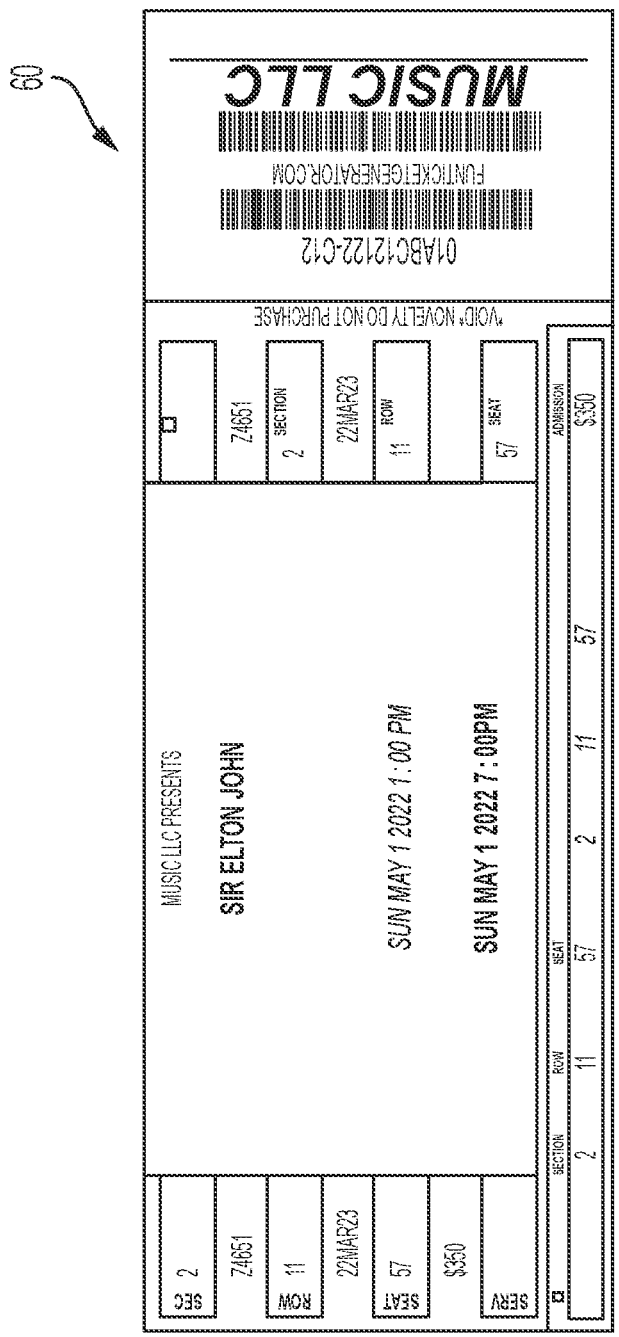
FIG. 6 illustrates in an image of a transformed document, in accordance with an embodiment.

FIG. 6 illustrates in an image 60 of a transformed document, in accordance with an embodiment. The transform table can be read to determine what bits/colors and color spaces are used. Each image can be checked to determine if it meets that criterion and no other (such as only values 254 and 255 used for color red in a RGB 8 bit color space) and if so, transformed and presented. An attempt to change the time can be presented as a showing fraud (e.g., 1 pm to 7 pm in FIG. 6).

Based on the foregoing, it can be appreciated that the foregoing methodology can be implemented to provide a framework for digital invisible ink and a transform table. The discussion above with respect to a ticket is a simple example, but the framework an allow for much more complex and varied uses.

Figure 7:
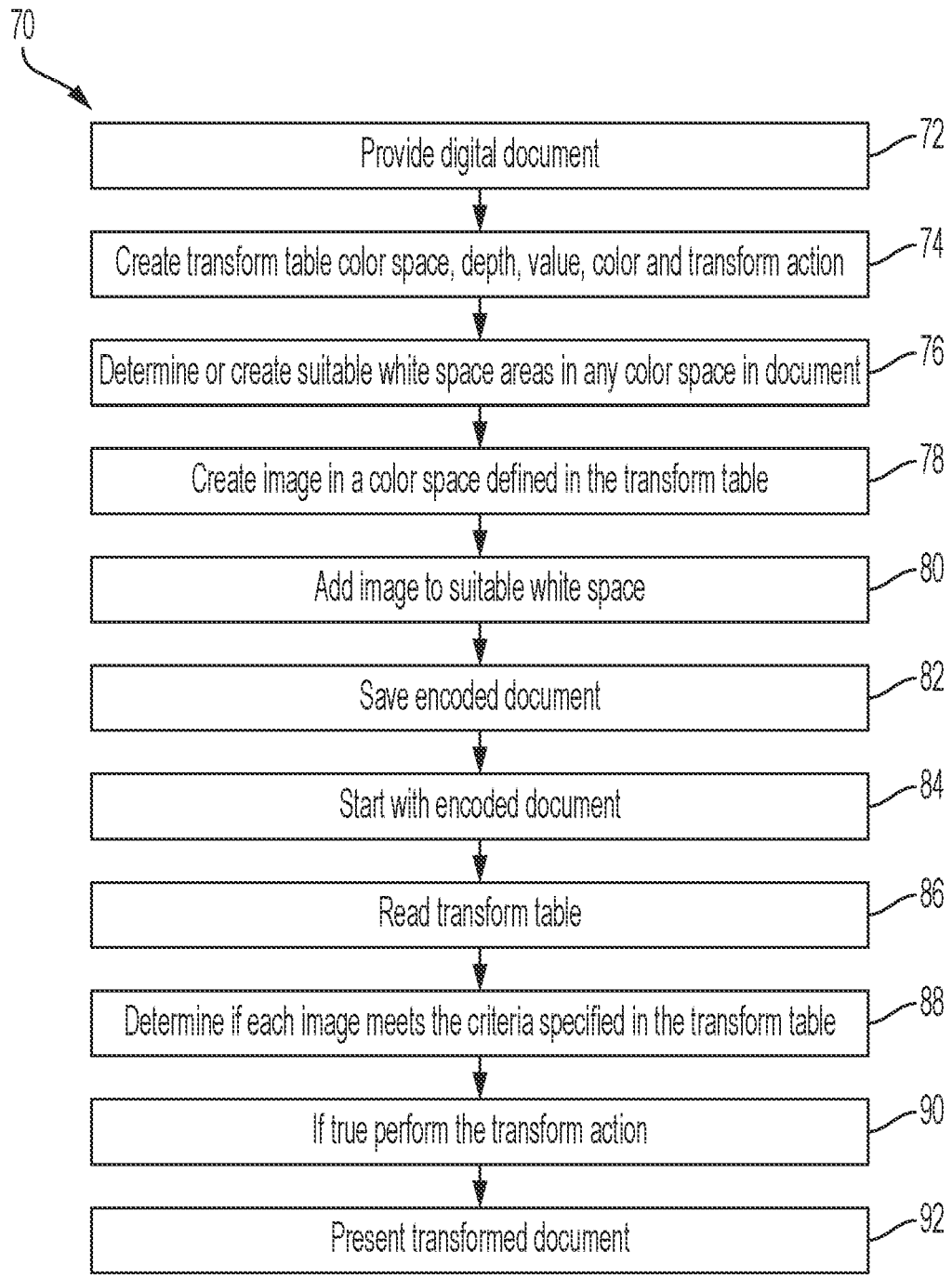
FIG. 7 illustrates a high-level flow chart of operation depicting logical operational steps of a method for rendering a document with digital invisible ink, in accordance with an embodiment.

FIG. 7 illustrates a high-level flow chart of operation depicting logical operational steps of a method 70 for embedding a hidden/invisible image or text into white space in a digital document and converting the invisible item into a visible item, in accordance with an embodiment. It should be appreciated that the method 70 shown in FIG. 7 is a methodology for providing 'digital invisible ink' for use in document security applications.

Each invisible item can be represented in a single color that is very close to white, such as using the least significant bit of cyan, which is not discernable from white by the human eye. However, a software application or web service may be more color sensitive and can correctly recognize the presence of the hidden item. The approach shown in FIG. 7 is flexible in that it uses a transformation table that can define how to convert the color of the hidden item so that it can be discerned by the human eye, instead of hardcoding the transformation rules. The system output can be a representation of the document where the item is plainly visible to a human.

As shown at block 72, a step or operation can be implemented in which a digital document (e.g., a ticket, as discussed previously) is provided. In other words, the method 70 begins with the digital document. Next, as illustrated at block 74, a step or operation can be implemented to create a transform table color space, depth, value, color and transform action. Thereafter, as illustrated at block 76, a step or operation can be implemented to determine or create suitable white space areas in any color space in the digital document.

Next, as shown at block 78, a step or operation can be implemented, to create an image in a color space defined in the transform table. Then, as illustrated at block 80, a step operation can be implemented to add an image to a suitable white space. Thereafter, as indicated at block 82, an operation can be implemented to save the encoded document.

Next, as shown at block 84, a step or operation can be implemented to start with the encoded ticket. That is, the next operating steps are implemented with respect to the encoded ticket. Then, as illustrated at block 86, a step or operation can be implemented to read the transform table. Thereafter, as indicated at block 88, a step operation can be implemented to determine if each image meets the criteria specified in the transform table. Then, as shown at block 90, a step operation can be implemented in which if the result of the operation shown at block 82 ("save encoded document") is true, the transform operation is performed. Next, as depicted at block 92, a step or operation can be implemented to present the transformed document.

Figure 8:
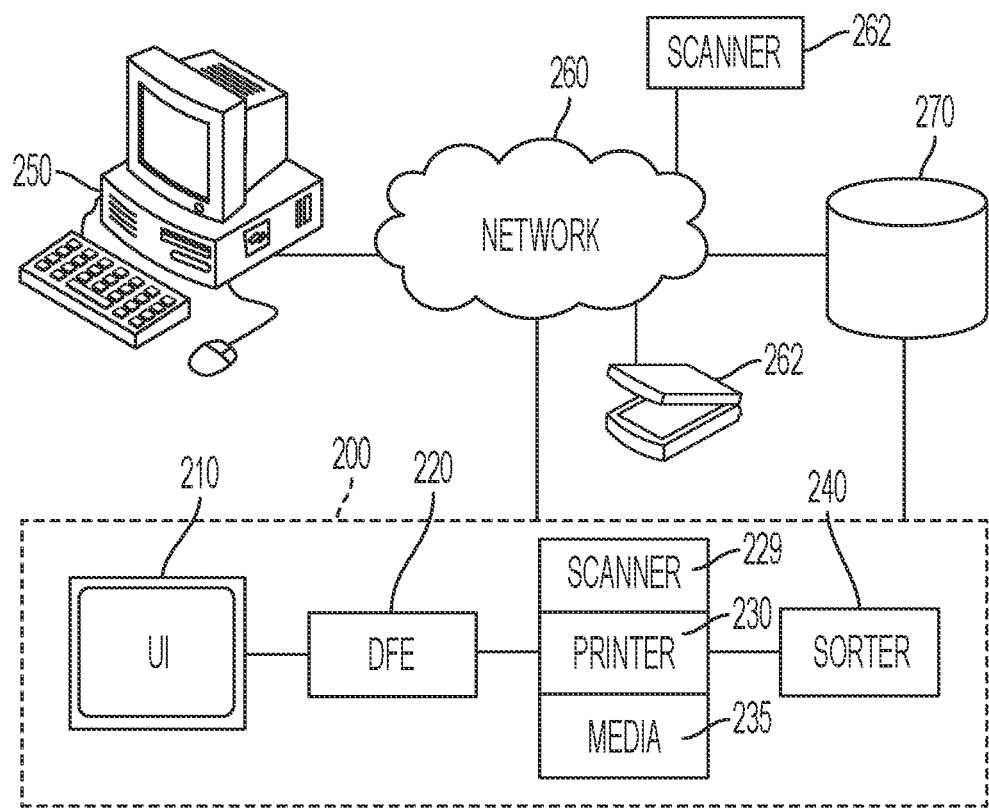
FIG. 8 illustrates a block diagram of a printing system suitable for implementing one or more of the disclosed embodiments.
Figure 9:
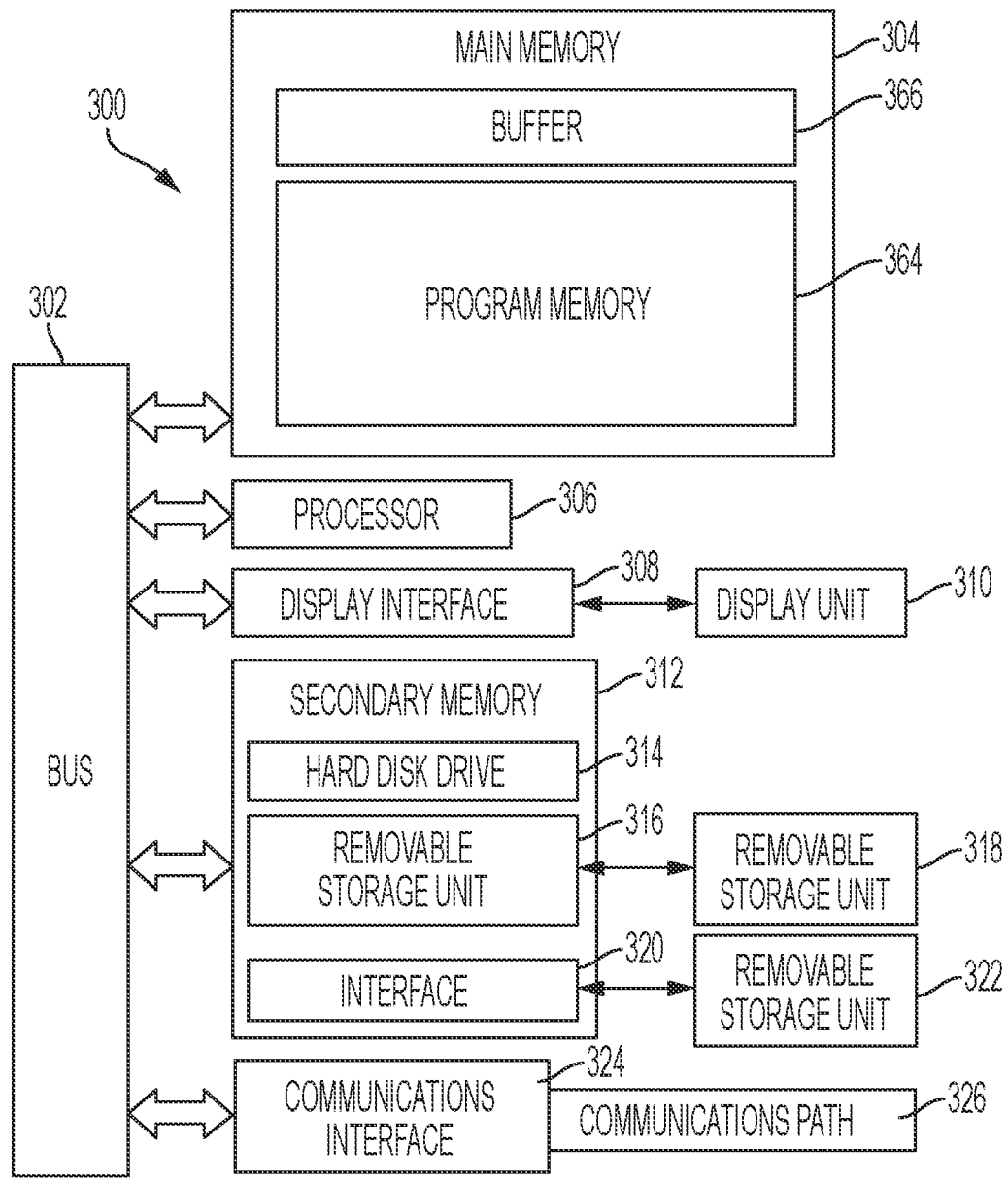
FIG. 9 illustrates a block diagram of a digital front-end controller useful for implementing one or more of the disclosed embodiments.

FIG. 8 illustrates a block diagram of a printing system 200 suitable for implementing one or more of the disclosed embodiments. FIG. 9 illustrates a block diagram of a digital front-end controller 300 useful for implementing one or more of the disclosed embodiments. For example, the printing system 200 and/or the digital front-end controller 300 can be used to render a document with the 'digital invisible ink' feature discussed above.

With reference to FIG. 8, a printing system (or image rendering system) 200 suitable for implementing various aspects of the exemplary embodiments described herein is illustrated. The printing system 200 can implement rendering operations such as scanning a document via a scanner and printing a document via a printer, wherein the document includes the disclosed two-layer correlation mark with a variable data hiding layer.

The printing system 200 can be used to embed a hidden/invisible image or text as discussed previously into the white space of a digital document, as well as implementing a flexible system/method to convert the invisible item into a visible item. The printing system 200 can represent each invisible item in a single color that is very close to white, such as using the least significant bit of cyan, which is not discernable from white by the human eye. The printing system 200 and/or in combination with a software application or web service may be more color sensitive and can correctly recognize the presence of the hidden item.

The printing system 200 can use the previously discussed transformation table, which can be configured to define how to convert the color of the hidden item so that it can be discerned by the human eye, instead of hardcoding the transformation rules. The output of the printing system 200 can be a representation of the document where the item is plainly visible to a human.

Note that the term 'scanner' as utilized herein may refer to an image scanner, which is a device or system that can optically scan images, printed text, handwriting or an object and converts it to a digital image. An example of a scanner is a flatbed scanner where the document to be imaged (e.g., a form) can be placed on a glass window for scanning. The scanner may in some cases be incorporated into a multi-function device (MFD), which also may possess printing and photocopying features. The scanner may also be incorporated into, for example, a printing system such as the printing system 200 shown in FIG. 8. For example, the scanner 229 is shown in FIG. 7 as a part of the printing system 200. Alternatively, or in addition to the scanner 229 included as a part of the printing system 100, a scanner may be implemented as a separate scanner 262 also depicted in FIG. 8, which can communicate with the network 260.

The word "printer" and the term "printing system" as used herein can encompass any apparatus and/or system; such as a digital copier, xerographic and reprographic printing systems, bookmaking machine, facsimile machine, multi-function machine, ink-jet machine, continuous feed, sheet-fed printing device, etc.; which may contain a print controller and a print engine and which may perform a print outputting function for any purpose.

The printing system 200 can include a user interface 210, a digital front-end (DFE) controller 220, and at least one print engine 230. The print engine 230 has access to print media 235 of various sizes and cost for a print job. The printing system 200 can comprise a color printer having multiple color marking materials.

A "print job" or "document" is normally a set of related sheets, usually one or more collated copy sets copied from a set of original print job sheets or electronic document page images, from a particular user, or otherwise related. For submission of a regular print job (or customer job), digital data can be sent to the printing system 200.

A sorter 240 can operate after a job is printed by the print engine 230 to manage arrangement of the hard copy output, including cutting functions. A user can access and operate the printing system 200 using the user interface 210 or via a data-processing system such as a workstation 250. The workstation 250 can communicate bidirectionally with the printing system 200 via a communications network 260.

A user profile, a work product for printing, a media library, and various print job parameters can be stored in a database or memory 270 accessible by the workstation 250 or the printing system 200 via the network 260, or such data can be directly accessed via the printing system 200. One or more color sensors (not shown) may be embedded in the printer paper path, as known in the art.

With respect to FIG. 9, an exemplary DFE (Digital Front End) controller 300 is shown in greater detail. The DFE controller 300 can include one or more processors, such as processor 306 capable of executing machine executable program instructions. The processor 306 can function as a DFE processor.

In the embodiment shown, the processor 306 can be in communication with a bus 302 (e.g., a backplane interface bus, cross-over bar, or data network). The digital front end 300 can also include a main memory 304 that is used to store machine readable instructions. The main memory 304 is also capable of storing data. The main memory 304 may alternatively include random access memory (RAM) to support reprogramming and flexible data storage. A buffer 366 can be used to temporarily store data for access by the processor 306.

Program memory 364 can include, for example, executable programs that can implement the embodiments described herein. The program memory 364 can store at least a subset of the data contained in the buffer. The digital front end 300 can include a display interface 308 that can forward data from a communication bus 302 (or from a frame buffer not shown) to a display 310. The digital front end 300 can also include a secondary memory 312 that can include, for example, a hard disk drive 314 and/or a removable storage drive 316, which can read and write to removable storage 318, such as a floppy disk, magnetic tape, optical disk, etc., that stores computer software and/or data.

The secondary memory 312 alternatively may include other similar mechanisms for allowing computer programs or other instructions to be loaded into the computer system. Such mechanisms can include, for example, a removable storage unit 322 adapted to exchange data through interface 320. Examples of such mechanisms include a program cartridge and cartridge interface (such as that found in video game devices), a removable memory chip (such as an EPROM, or PROM) and associated socket, and other removable units and interfaces, which allow software and data to be transferred.

The digital front end (DFE) controller 300 can include a communications interface 324, which can act as an input and an output to allow software and data to be transferred between the digital front end controller 300 and external devices. Examples of a communications interface include a modem, a network interface (such as an Ethernet card), a communications port, a PCMCIA slot and card, etc.

Computer programs (also called computer control logic) and including one or more modules may be stored in the main memory 304 and/or the secondary memory 312. Computer programs or modules may also be received via a communications interface 324. Such computer programs or modules, when executed, enable the computer system to perform the features and capabilities provided herein. Software and data transferred via the communications interface can be in the form of signals which may be, for example, electronic, electromagnetic, optical, or other signals capable of being received by a communications interface.

These signals can be provided to a communications interface via a communications path (i.e., channel), which carries signals and may be implemented using wire, cable, and fiber optic, phone line, cellular link, RF, or other communications channels.

Part of the data stored in secondary memory 312 for access during a DFE operation may be a set of translation tables that can convert an incoming color signal into a physical machine signal.

This color signal can be expressed either as a colorimetric value; usually three components as L*a*b*, RGB, XYZ, etc.; into physical exposure signals for the four toners cyan, magenta, yellow and black. These tables can be created outside of the DFE and downloaded but may be optionally created inside the DFE in a so-called characterization step. Part of the data stored in secondary memory 312 may also be the previously discussed transformation table.

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

The disclosed example embodiments are described at least in part herein with reference to flowchart illustrations and/or block diagrams and/or schematic diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. The computer program product may include a computer readable storage medium (or media) having computer readable program instructions thereon for causing a processor to carry out aspects of the embodiments.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flow charts and block diagrams in the figures illustrate the architecture, functionality, and operation of possible implementations of systems, methods, and computer program products according to various embodiments (e.g., preferred or alternative embodiments). In this regard, each block in the flow chart or block diagrams depicted and described herein can represent a module, segment, or portion of instructions, which can comprise one or more executable instructions for implementing the specified logical function (s).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which may be typically private (accessible only to that module) and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of such modules according to the approach described herein can lead to improvements in processing speed and in energy savings and efficiencies in a data-processing system such as, for example, the printing system 200 shown in FIG. 8 and/or the DFE controller 300 shown in FIG. 8. A "module" can perform the various steps, operations or instructions discussed herein, such as the steps or operations discussed herein with respect to FIG. 1 to FIG. 7.

The method 70 shown in FIG. 7, for example, may be implemented, in part, in a computer program product comprising a module that may be executed by, for example, DFE controller 220 discussed previously with respect to FIG. 8. The computer program product may comprise a non-transitory computer-readable recording medium on which a control program can be recorded (e.g., stored), such as a disk, hard drive, or the like. Note that the term 'recording medium' as utilized herein can relate to such a non-transitory computer-readable recording medium.

Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the DFE controller 220 (for example, an internal hard drive of RAM), or may be separate (for example, an external hard drive operatively connected with the printer), or may be separate and accessed via a digital data network such as a local area network (LAN) or the Internet (e.g., as a redundant array of inexpensive or independent disks (RAID) or other network server storage that can be indirectly accessed by the DFE controller 220, via a digital network such as the network 260 shown in FIG. 8).

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed example pseudo-code discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventors have realized a non-abstract technical solution to the technical problem to improve a computer-technology by improving efficiencies in such computer technology. The disclosed embodiments offer technical improvements to a computer-technology such as a data-processing system, and further provide for a non-abstract improvement to a computer technology via a technical solution to the technical problem(s) identified in the background section of this disclosure. Such improvements can result from implementations of the embodiments. The claimed solution may be rooted in computer technology in order to overcome a problem specifically arising in the realm of computers, computer networks, and printing and scanning. The claimed solution may also involve non-abstract devices such as security devices including non-abstract features such as printed media (e.g., paper) upon which the security device (e.g., a watermark) may be rendered.

Based on the foregoing, it can be appreciated that a number of embodiments, including preferred and alternative embodiments, are disclosed herein. In an embodiment, a method for rendering digital invisible ink, can involve: representing an invisible item in a single color that is not discernable from white by a human eye; embedding the invisible item into white space of a digital document; and converting the invisible item into a visible item using a transform table that defines how to convert the single color of the invisible item so that the invisible item after a conversion to the visible item is discernable by the human eye.

An embodiment can involve configuring the transform table as a table containing data indicative of at least: a color space, a depth value, a color and a transform action.

An embodiment can also involve creating an image in a color space defined in the transform table, wherein the invisible item comprises the image.

An embodiment can further involve comprising adding the image to the white space.

An embodiment can involve reading the transform table and determining when the image meets criterion specified in the transform table.

An embodiment can further involve converting the invisible item into a visible item, further comprising: performing the transform action.

An embodiment can involve configuring the transform table as a table containing data indicative of at least: a color space, a depth value, a color and a transform action; creating an image in a color space defined in the transform table, wherein the invisible item comprises the image; adding the image to the white space; reading the transform table; and determining when the image meets criterion specified in the transform table.

An embodiment can also involve converting the invisible item into a visible item, further comprising: performing the transform action.

In another embodiment, a system for rendering digital invisible ink, can include at least one processor and a memory, the memory storing instructions to cause the at least one processor to perform: representing an invisible item in a single color that is not discernable from white by a human eye; embedding the invisible item into white space of a digital document; and converting the invisible item into a visible item using a transform table that defines how to convert the single color of the invisible item so that the invisible item after a conversion to the visible item is discernable by the human eye.

In an embodiment, the instructions can cause the at least one processor to perform: configuring the transform table as a table containing data indicative of at least: a color space, a depth value, a color and a transform action.

In an embodiment, the instructions can cause the at least one processor to perform: creating an image in a color space defined in the transform table, wherein the invisible item comprises the image.

In an embodiment, the instructions can cause the at least one processor to perform: adding the image to the white space.

In an embodiment, the instructions can cause the at least one processor to perform: reading the transform table and determining when the image meets criterion specified in the transform table.

In an embodiment, converting the invisible item into a visible item, can further involve performing the transform action.

In an embodiment, the instructions can cause the at least one processor to perform: configuring the transform table as a table containing data indicative of at least: a color space, a depth value, a color and a transform action; creating an image in a color space defined in the transform table, wherein the invisible item comprises the image; adding the image to the white space; reading the transform table; and determining when the image meets criterion specified in the transform table.

In another embodiment, a security apparatus for rendering digital invisible ink, can include: an invisible item represented in a single color that is not discernable from white by a human eye; the invisible item embedded into white space of a digital document; and the invisible item covered into a visible item with a transform table that defines how to convert the single color of the invisible item so that the invisible item after a conversion to the visible item is discernable by the human eye.

In an embodiment of the security apparatus, the transform table is operable as a table containing data indicative of at least: a color space, a depth value, a color and a transform action.

In an embodiment of the security apparatus, the image can be created in a color space defined in the transform table, wherein the invisible item comprises the image.

In an embodiment of the security apparatus, the transform table can be configured as a table containing data indicative of at least: a color space, a depth value, a color and a transform action, and an image can be created in a color space defined in the transform table, wherein the invisible item comprises the image. In addition, the image can be added to the white space, the transform table can be read, and a determination can be made regarding when the image meets criterion specified in the transform table.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for rendering digital invisible ink, comprising: representing an invisible item in a single color that is not discernable from white by a human eye; embedding the invisible item into white space of a digital document; converting the invisible item into a visible item using a transform table that defines how to convert the single color of the invisible item so that the invisible item after a conversion to the visible item is discernable by the human eye; and configuring the transform table as a table containing data indicative of at least: a color space, a depth value, a color and a transform action.

2. The method of claim 1 further comprising:
creating an image in a color space defined in the transform table, wherein the invisible item comprises the image.

3. The method of claim 2 further comprising adding the image to the white space.

4. The method of claim 2 further comprising:
reading the transform table;
determining when the image meets criterion specified in the transform table.

5. The method of claim 1 wherein converting the invisible item into a visible item, further comprising: performing the transform action.

6. The method of claim 1 further comprising:
configuring the transform table as a table containing data indicative of at least: a color space, a depth value, a color and a transform action;
creating an image in a color space defined in the transform table, wherein the invisible item comprises the image;
adding the image to the white space;
reading the transform table;
determining when the image meets criterion specified in the transform table.

7. The method of claim 6 wherein converting the invisible item into a visible item, further comprising: performing the transform action.

8. A system for rendering digital invisible ink, comprising: at least one processor and a memory, the memory storing instructions to cause the at least one processor to perform: representing an invisible item in a single color that is not discernable from white by a human eye; embedding the invisible item into white space of a digital document; converting the invisible item into a visible item using a transform table that defines how to convert the single color of the invisible item so that the invisible item after a conversion to the visible item is discernable by the human eye; and configuring the transform table as a table containing data indicative of at least: a color space, a depth value, a color and a transform action.

9. The system of claim 8 wherein the instructions further cause the at least one processor to perform:
creating an image in a color space defined in the transform table, wherein the invisible item comprises the image.

10. The system of claim 9 wherein the instructions further cause the at least one processor to perform:
adding the image to the white space.

11. The system of claim 9 wherein the instructions further cause the at least one processor to perform:
reading the transform table;
determining when the image meets criterion specified in the transform table.

12. The system of claim 8 wherein converting the invisible item into a visible item, further comprising: performing the transform action.

13. The system of claim 8 wherein the instructions further cause the at least one processor to perform: configuring the transform table as a table containing data indicative of at least: a color space, a depth value, a color and a transform action; creating an image in a color space defined in the transform table, wherein the invisible item comprises the image; adding the image to the white space; reading the transform table; determining when the image meets criterion specified in the transform table.

14. A security apparatus for rendering digital invisible ink, comprising at least one processor coupled to memory further comprising: an invisible item represented in a single color that is not discernable from white by a human eye; the invisible item embedded into white space of a digital document; and the invisible item covered into a visible item with a transform table that defines how to convert the single color of the invisible item so that the invisible item after a conversion to the visible item is discernable by the human eye; wherein the transform table is operable as a table containing data indicative of at least: a color space, a depth value, a color and a transform action.

15. The security apparatus of claim 14 wherein an image is created in a color space defined in the transform table, wherein the invisible item comprises the image.

16. The security apparatus of claim 14 wherein:
- the transform table is configured as a table containing data indicative of at least: a color space, a depth value, a color and a transform action;
- an image is created in a color space defined in the transform table, wherein the invisible item comprises the image;
- the image is added to the white space;
- the transform table is read;
- a determination is made regarding when the image meets criterion specified in the transform table.

* * * * *